United States Patent
Van de Moortele

(10) Patent No.: US 6,238,567 B1
(45) Date of Patent: *May 29, 2001

(54) METHOD OF MAKING BRINE FOR REGENERATION OF A SOFTENING APPLIANCE

(75) Inventor: Guido Ivo Cesar Maria Van de Moortele, Antwerp (BE)

(73) Assignee: Padema, Naamloze Vennootschap, Antwerp (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,086

(22) Filed: Nov. 3, 1998

(30) Foreign Application Priority Data

Nov. 4, 1997 (BE) .................................................. 09700881

(51) Int. Cl.$^7$ ...................................................... B01J 49/00
(52) U.S. Cl. .......................... 210/670; 210/792; 210/123; 210/190; 210/86
(58) Field of Search .................................... 210/123, 190, 210/86, 670, 792, 191, 269; 137/430, 444, 442, 391, 398, 386, 399, 409, 411, 426, 429, 432, 101.27

(56) References Cited

U.S. PATENT DOCUMENTS

| | | | |
|---|---|---|---|
| 2,695,626 | * | 11/1954 | Riche . |
| 2,904,062 | * | 9/1959 | Techler . |
| 2,906,285 | * | 9/1959 | Rosten et al. . |
| 3,530,876 | | 9/1970 | Stoner . |
| 3,570,520 | * | 3/1971 | Sodi . |
| 3,574,559 | | 4/1971 | Kryzer et al. . |
| 3,844,309 | * | 10/1974 | Tischler . |
| 4,336,134 | * | 6/1982 | Prior . |
| 5,239,285 | * | 8/1993 | Rak . |

* cited by examiner

Primary Examiner—Joseph W. Drodge
Assistant Examiner—Terry K Cecil
(74) Attorney, Agent, or Firm—Bacon & Thomas

(57) ABSTRACT

Described is a method for making brine to be used for regenerating water softening appliances. The brine is made in a reservoir having a float mechanism therein coupled to a seal that prevents the brine from dropping below a predetermined level in the reservoir. This creates a stock buffer of brine that always remain in the reservoir so that after adding a sufficient volume of water to regenerate a softening applicant, an effective concentration of brine is immediately available above the predetermined level for carrying out the regeneration. This allows for minimal wait time between subsequent regenerations of one or a plurality of water softening appliances. Preferably, an over-flow warning device cooperating with the reservoir water intake is also provided.

10 Claims, 4 Drawing Sheets

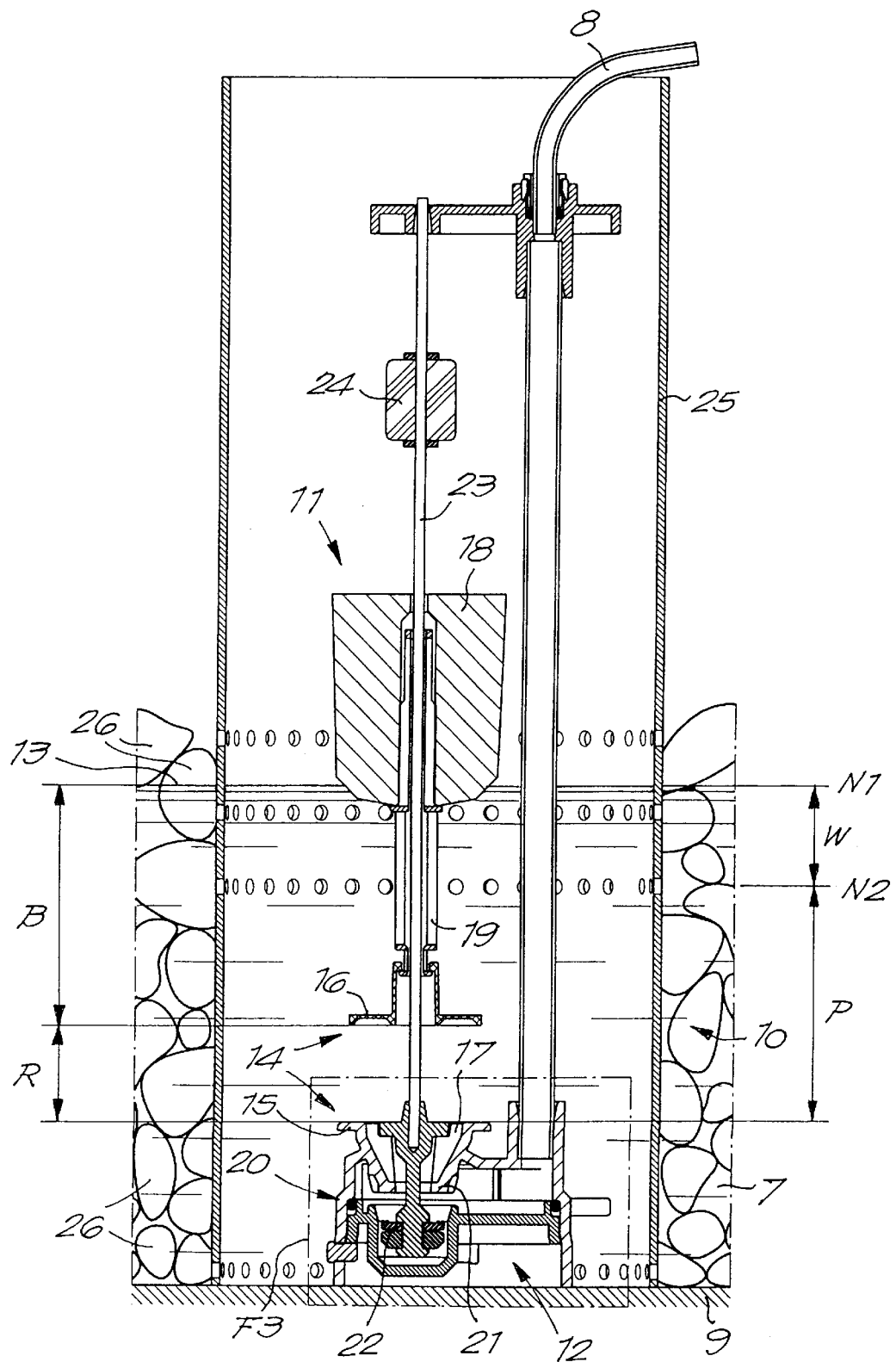

METHOD OF MAKING BRINE FOR REGENERATION OF A SOFTENING APPLIANCE

FIELD OF THE INVENTION

The present invention concerns a brine device, in particular a brine device for making brine for regenerating the active medium of water softening appliances or similar treatment appliances, such as for regenerating a cation exchange resin.

In particular, the invention concerns an improved brine device of the type which consists of a reservoir in which salt to be dissolved can be provided and onto which water can be supplied and from which brine can be extracted.

BACKGROUND OF THE INVENTION

It is known to provide water softening appliances which are coupled to such a brine device with a control unit, a control valve, which makes sure that water is periodically supplied to the reservoir and which also makes sure that, after this water has been turned into brine, due to the contact with the salt, this brine is drawn in from the salt tank so as to regenerate the above-mentioned active medium.

In conventional brine devices, the reservoir is practically entirely emptied with each regeneration, so that it often takes more than one hour before the water which is supplied to the reservoir at the end of the regeneration cycle has formed a saturated brine with the salt. Such brine devices are described among others in BE 578.211, U.S. Pat. No. 3,570,520 and U.S. Pat. No. 3,844,305. Hence, with such a brine device it is not possible to carry out successive regenerations.

In order to advance the transformation of water into saturated brine, it is already known to make the water circulate in the brine vessel by means of a circulation pump, for example as described in NL 7114100. Although the transformation process is advanced by this, it still takes a relatively long time to produce the brine.

Finally, another brine device is known from U.S. Pat. No. 4,336,134 with a float-controlled valve, whereby the float cooperates with the valve via magnetically coupled parts The device described in this document is disadvantageous in that the construction is quite complex due to the use of the above-mentioned magnetic coupling and as a consequence is not very reliable. Moreover, this brine device does not allow for an easy setting of the brine reserves.

SUMMARY OF THE INVENTION

The present invention provides an improved brine device in relation to the known embodiments whereby one or several of the above-mentioned disadvantages are overcome.

To this end, the invention consists of a brine device, in particular for making brine for regenerating the active medium of one or several water softening appliances, consisting of a reservoir in which salt to be dissolved can be provided and into which water can be supplied and from which brine can be extracted, characterized in that this brine device is provided with a float mechanism and with sealing means working in conjunction with it via a mechanical coupling, such that the latter prevents the level in the reservoir from dropping underneath a certain mark as the brine is extracted, such that a stock buffer of saturated brine retains available.

Thus a certain amount of liquid, in particular brine, always remains in the brine device which functions as a buffer. Thanks to the presence of this buffer, there will always be a certain quantity of water which has had the time to be transformed into brine, so that a possible waiting time is excluded.

According to a preferred embodiment, the sealing means consist of a valve disc cooperating with an opening through which the brine can be discharged, and the float mechanism consists of a float on the one hand and the above-mentioned mechanical coupling on the other hand which forms a connection between the float and the valve disc which makes sure that the above-mentioned opening is sealed by means of the valve disc when the float drops under a certain level.

It should be noted that the sealing means preferably operate on the level of the suction point of the brine. Thus there is always a considerable pressure from the liquid in the buffer on the valve of the sealing means, so that a good sealing can be guaranteed when the valve is closed.

According to a preferred embodiment, the invention includes a brine device which is meant to cooperate with one or several water softening appliances, characterized in that the float mechanism and the valve are coupled such that a large stock buffer is created that with a maximum charge of the water softening appliances, the concentration of the brine always remains more than 60%. According to the most preferred embodiment, a stock buffer will be provided which makes sure that there is always enough entirely saturated or almost entirely saturated brine to carry out all regenerations.

Preferably, the brine device will also be provided with an overflow warning device cooperating with an intake for water. This overflow warning device preferably consists of a valve working in conjunction with the intake which is controlled by the same float mechanism which also controls the sealing means, whereby the float mechanism makes sure that the above-mentioned valve is closed when a certain level is exceeded. In this manner is required only one float is required, both for controlling the above-mentioned sealing means and for making the overflow warning device work.

BRIEF DESCRIPTION OF THE DRAWINGS

In order to better explain the characteristics of the invention, the following preferred embodiment is described as an example only, without being limitative in any way, with reference to the accompanying drawings, in which:

FIG. 2 represents the part indicated by arrow F2 in FIG. 1 to a larger scale and seen as a section;

DETAILED DESCRIPTION OF THE DRAWINGS

Figure 1:
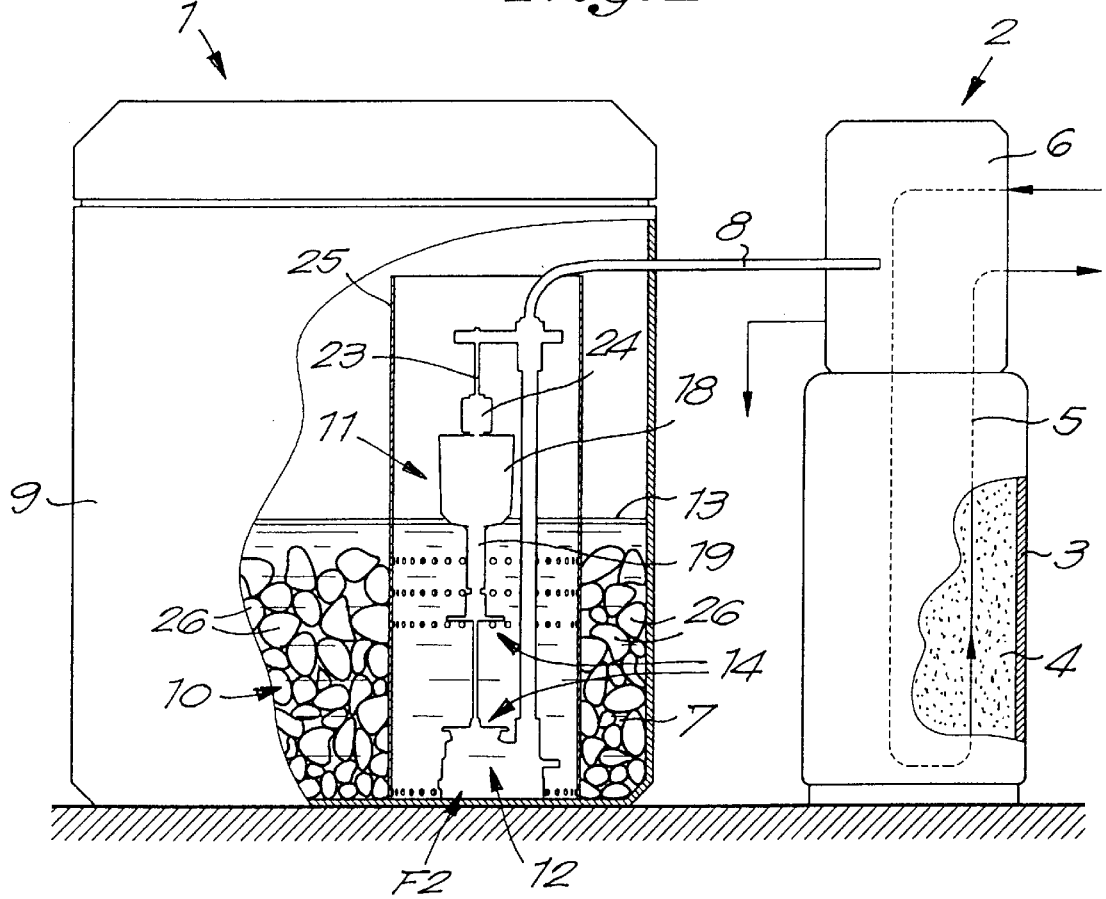
FIG. 1 schematically represents a brine device according to the invention which is connected to a water softening appliance.
Figure 3:
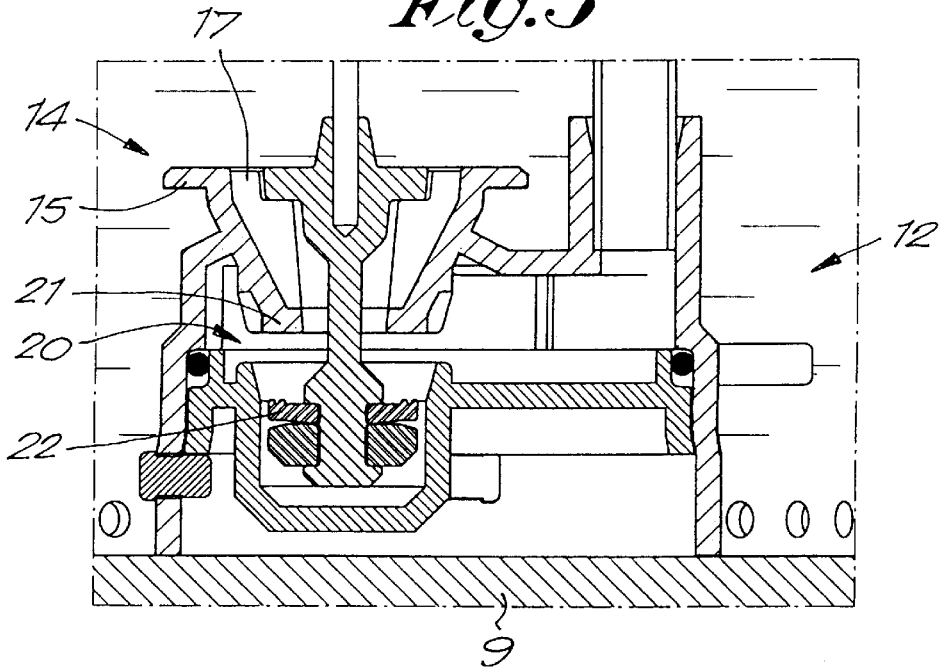
FIG. 3 represents the part which is indicated by F3 in FIG. 2 to a larger scale.
Figure 4:
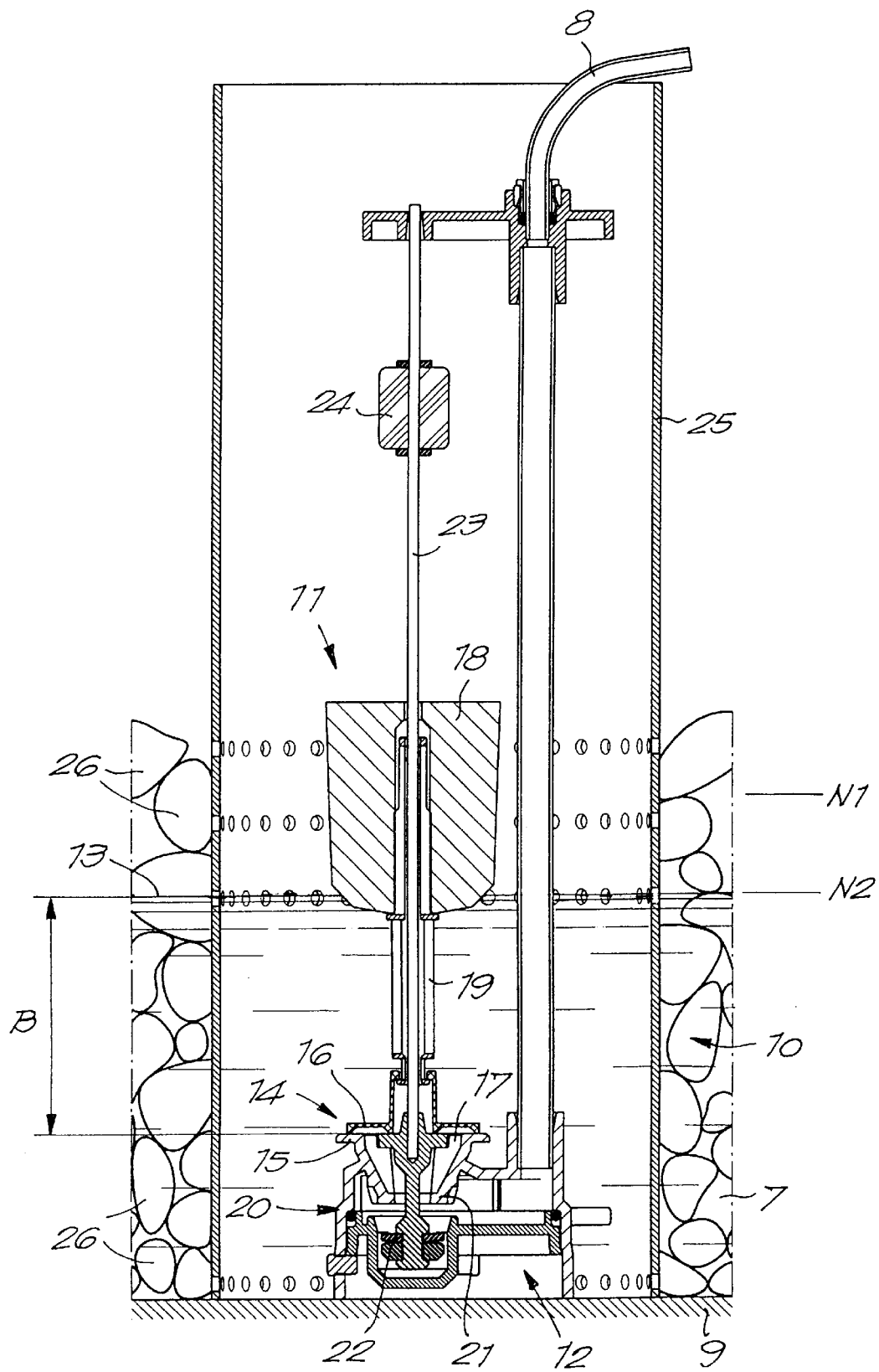
FIGS. 4 and 5 show views which are similar to those of FIG. 2, but for two different positions.
Figure 5:
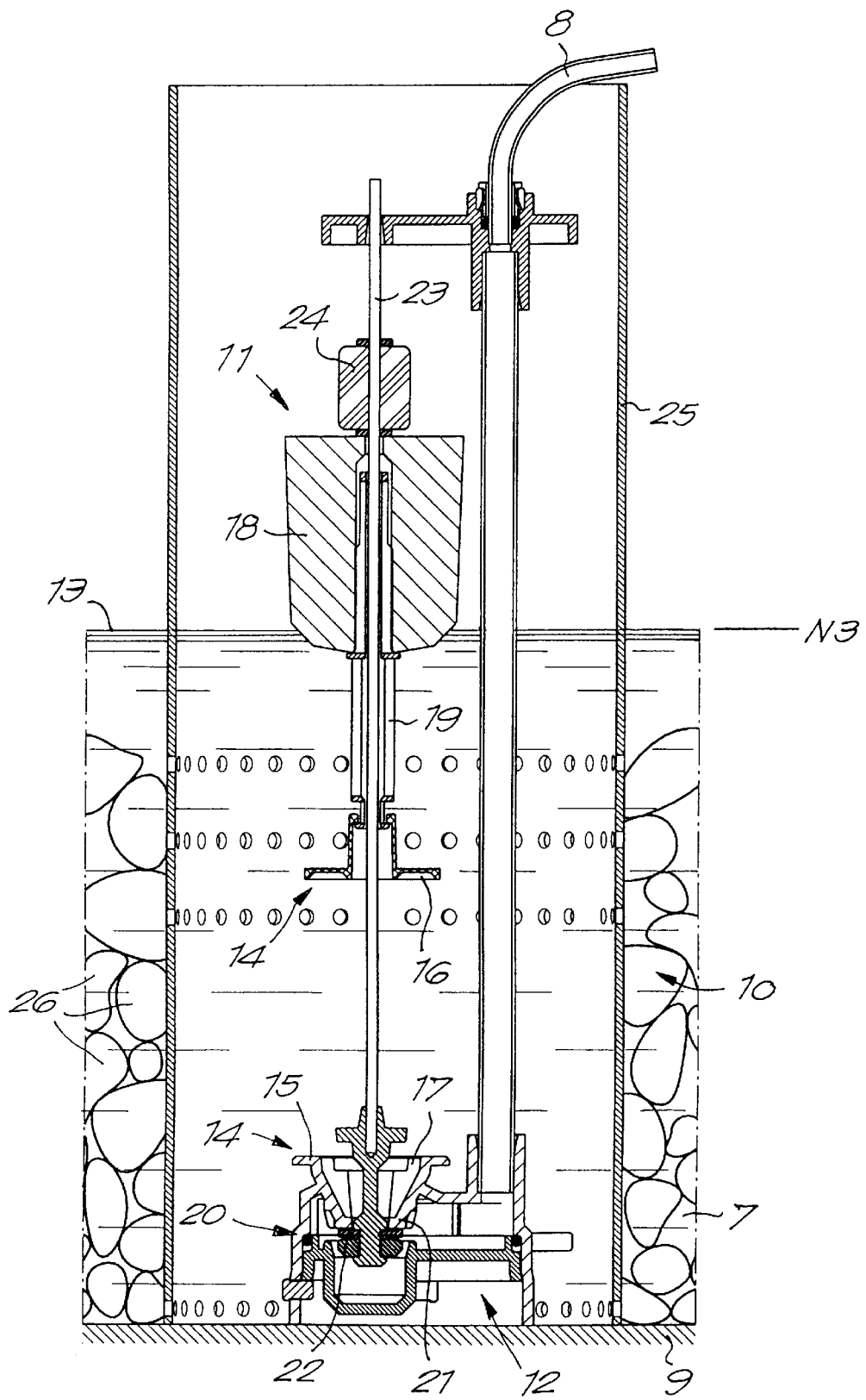

FIG. 1 schematically represents a brine device 1 according to the invention which is coupled to a water softening appliance 2.

The water softening appliance 2 contains a tank 3 with an active medium 4, such as a cation exchange resin, whereby the water to be treated, when the water softening appliance 2 is in use, is driven through the medium 4, as is schematically represented by line 5.

In order to regularly regenerate the active medium 4, the water softening appliance 2 is provided with a control unit 6 which makes sure that brine 7 is regularly extracted from the brine device 1 and driven through the active medium 4, and which also makes sure that a quantity of water is again supplied to the brine device 1.

In the given example, the brine 7 is extracted and the water is supplied by means of one and the same connecting pipe 8.

The brine device 1 mainly consists of a reservoir 9 in which salt 10 to be dissolved is provided, such that water added to this is transformed into brine after a certain length of time.

The invention is special in that the brine device 1 is provided with sealing means 12 working in conjunction with a float mechanism 11 which prevents the level 13 in the reservoir 9 from dropping beneath a certain mark as the brine 7 is extracted, such that a stock buffer of brine remains available.

The sealing means 12 in this case consists of a valve 14 with a valve seat 15 and a valve disc 16 working in conjunction with it, with which the opening 17 through which the brine 7 can be discharged, can be sealed. This opening 17 is situated at the bottom of the reservoir 9 as the most saturated brine 7 with the highest concentration is always situated at the bottom.

The float mechanism 11 contains a float 18 and a mechanical coupling 19 between the float 18 and the valve disc 16, such that the opening 17 is sealed by the valve disc 16 as soon as the float 18 drops under a certain level.

The brine device 1 is also provided with an overflow warning device which is controlled by the float 18.

This overflow warning device consists of a valve 20 working in conjunction with the opening 17, formed of a valve seat 21 and a valve disc 22, whereby this valve 20 is connected to the float 18 in such a way that it is closed when the level 13 reaches a certain mark.

As represented, both valve seats 15, 21 are situated near the opening 17. The valve seat 15 is hereby directed upward, whereas the valve seat 21 is directed downward.

The float mechanism 11 as a whole is composed of a guide 23 fixed to the valve disc 22 and which extends upward and can also move upward, over which the float 18 can be displaced; a catch element 24 fixed on the guide 23 above the float 18 which can cooperate with the float 18; and the above-mentioned coupling 19.

The valve disc 16, as represented, is preferably freely suspended to the bottom end of the coupling 19, which offers the advantage that the sealing of the valve 14 is not disturbed by possible oscillations of the float 18.

The height of the float 18 in relation to the sealing means 12, in particular in relation to the valve disc 16, can be preferably set, for example as the coupling 19 can be screwed farther or less far in the float 18

As is represented, the whole of the sealing means 12, the float mechanism 11 and the overflow warning device is mounted in the usual manner in a perforated, tubular protection 25 which prevents the salt 10, in particular the salt particles 26, from hindering the good working order.

The working of the brine device can be derived from FIGS. 2 to 5.

When the water softening appliance 2 is in use, the level 13, as represented in FIG. 2, shows a mark N1

When a regeneration is started, the control unit 6 makes sure that brine 7 is sucked in via the connection pipe 8. As a result thereof, the level 13 will drop. This drop will continue until the valve disc 16 ends up on the valve seat 15. The level 13 will hereby be set at mark N2, whereby a quantity of brine 7 is drawn out corresponding to the indicated distance R.

Thanks to the fact that, according to the invention, the drawing in of brine 7 is interrupted at mark N2, a certain quantity of water and brine mixture will always remain in the reservoir 9 functioning as a buffer, which quantity is indicated in the figures by the distance B.

At the end of the regeneration, the control unit 6 will make sure that a quantity of water is brought into the reservoir 9 corresponding to or practically corresponding to the withdrawn quantity of brine 7. The situation as represented in FIG. 2 is hereby recreated.

Theoretically, we could say that at this time, the quantity of liquid extending over the height W, which in theory is as large as the height R, consist of pure water, whereas the liquid underneath it, in particular the part indicated by P, consist of brine, of which at least the lower part, indicated by the distance R, is saturated brine Also, it is clear that saturated brine 7 is always available in this way, so that brine 7 can be supplied almost immediately for a subsequent regeneration, for example to a second water softening device which is also coupled to the same brine device 1.

According to a particular characteristic of the invention, the float mechanism 11 and the sealing means 12, in particular the valve disc 16, are coupled to one another in such a way that such a large buffer will be available that, with a maximum charge of the water softening appliances coupled onto them, either the appliance 2 or several appliances, a sufficient quantity of brine 7, in particular saturated brine, will always be available for all regenerations, or at least brine with a degree of saturation of 60% will always be available.

By setting the distance between the float 18 and the valve disc 16, the volume of said buffer can be adjusted in accordance with the demands of the water softening appliances coupled to the brine device 1.

If, in case of a malfunctioning of the control unit 6 or of the control valve provided therein, the water supply is not interrupted in time, the level 13 will rise until the float 18 touches the catch element 24 and carries along this catch element 24, together with the guide 23 fixed onto it and with the valve disc 22 fixed onto it, until the opening 17 is sealed as the valve disc 22 ends up against the valve seat 21.

It should be noted that the level 13 is always automatically readjusted after there has been an irregularity. If, for example, after a long standstill due to desiccation or for any other reason whatsoever, the level 13 should drop under mark N2, no brine will be delivered during one or two regenerations, but water will be admitted, so that the level 13 goes back to a normal mark. Also when a quantity of water is provided in the brine device 1 possibly exceeding the quantity of brine 7 which had been drawn out, this will not disturb the good working order of the brine device 1, as the reservoir 9 is always drained to the same mark N2 at each regeneration.

According to a variant, the valve 20 can also be used as a metering element instead of as an overflow warning device. When applied in this way, the catch element 24 will be positioned such that the valve 20 closes when mark N1 is reached during the refill.

Although the discharge of brine 7 and the supply of water is preferably carried out via the same opening 17, it is not excluded according to the invention to provide for an embodiment whereby brine 7 is discharged and water is supplied via a separate outlet, inlet respectively.

The present invention is by no means restricted to the embodiment described as an example and represented in the accompanying drawings; on the contrary, such a brine device can be made in all sorts of shapes and dimensions while still remaining within the scope of the invention.

What is claimed is:

1. In a method for making brine in a brine making device for regenerating an active medium of at least one softening appliance, said brine making device having a reservoir in which salt to be dissolved is provided and onto which water can be supplied to form said brine and from which the brine can be removed via an opening, wherein the improvement comprises:
   (a) providing the brine device with a float mechanism and with a seal working in conjunction with said float mechanism via a mechanical coupling to prevent brine from dropping below a predetermined level in said reservoir; and
   (b) providing a distance between said float and said seal such that when the level of brine reaches said predetermined level, a volume of stock buffer of brine remains in said reservoir such that after adding a sufficient volume of water to regenerate the at least one softening appliance, an effective concentration of brine is immediately formed above said predetermined level for carrying out a next regeneration of said at least one softening appliance.

2. The method of claim 1, wherein the stock buffer is sufficient that with a maximum charge of the water softening appliances the concentration of brine in the stock buffer will always exceed 60%.

3. The method of claim 1, wherein the brine is removed from the reservoir via a suction point and in that the seal operates on the level of the suction point.

4. The method of claim 1, wherein the seal comprises a valve working in conjunction with the opening via which the brine can be discharged and wherein the float mechanism comprises a float and the mechanical coupling extends between the float and the valve and wherein the opening is sealed by means of the valve when the float drops under a certain level.

5. The method of claim 4, wherein the float mechanism and the sealing means are coupled such that there is always enough entirely saturated or almost entirely saturated brine to carry out all regenerations.

6. The method of claim 4, wherein the distance between the float mechanism can be adjusted in relation to the seal.

7. The method according to claim 4, wherein the brine device is provided with a common opening for the supply of water and the removal of brine; in that two valve seats are provided near this opening which are directed upward and downward respectively; in that the seal has a valve disc cooperating with the upward directed valve seat; in that the valve of the overflow warning device has a valve disc cooperating with the downward directed valve seat; and in that the float mechanism is comprised of a guide fixed to the valve disc of the overflow warning device, said guide extends upward and can also move upward, overwhich the float can be displaced; a catch element is fixed on the guide above the float which can cooperate with the float and the coupling.

8. The method of claim 1 wherein the brine device is provided with an overflow warning device working in conjunction with an opening for the supply of water.

9. The method of claim 8, wherein the overflow warning device consists of a valve working in conjunction with the opening which is controlled by the float mechanism which also controls the seal, whereby the float mechanism closes the valve when the level in the reservoir reaches a predetermined mark.

10. The method of claim 1, wherein the volume of the stock buffer is at least 60% of the complete volume of liquid in the reservoir when said reservoir is in a filled condition and such that upon starting a second regeneration immediately after a first regeneration, brine above said predetermined level is available for the second regeneration which is at least 60% saturated brine.

* * * * *